United States Patent [19]

Akimoto

[11] Patent Number: 4,996,959
[45] Date of Patent: Mar. 5, 1991

[54] IGNITION TIMING CONTROL SYSTEM FOR AUTOMOTIVE ENGINE

[75] Inventor: Akira Akimoto, Musashino, Japan

[73] Assignee: Fuji Jukogyo Kabushiki Kaisha, Tokyo, Japan

[21] Appl. No.: 374,307

[22] Filed: Jun. 28, 1989

[30] Foreign Application Priority Data

| Jul. 13, 1988 [JP] | Japan | 63-175946 |
| Jul. 13, 1988 [JP] | Japan | 63-175947 |
| Jul. 13, 1988 [JP] | Japan | 63-175945 |
| Jul. 14, 1988 [JP] | Japan | 63-175551 |

[51] Int. Cl.$^5$ ............................................. F02P 5/15
[52] U.S. Cl. .................................. 123/422; 73/118.2; 123/423
[58] Field of Search ............... 123/416, 417, 422, 423, 123/494, 492, 493; 73/118.2

[56] References Cited

U.S. PATENT DOCUMENTS

| 4,425,890 | 1/1984 | Yamaguchi | 123/417 X |
| 4,498,438 | 2/1985 | Sato | 123/417 X |
| 4,502,442 | 3/1985 | Takakuwa et al. | 123/417 |
| 4,886,030 | 12/1989 | Oba et al. | 123/422 X |
| 4,893,244 | 1/1990 | Tang et al. | 123/417 X |

FOREIGN PATENT DOCUMENTS

| 61-229954 | 10/1986 | Japan . |
| 62-261645 | 11/1987 | Japan . |
| 62-265449 | 11/1987 | Japan . |

Primary Examiner—Tony M. Argenbright
Attorney, Agent, or Firm—Martin A. Farber

[57] ABSTRACT

The quantity of air passing a throttle valve of an engine is calculated and a weight for a weighted average is derived from a map in accordance with throttle valve position and engine speed. Engine load data is obtained by adding a last engine load data at a last program and a quotient calculated by dividing the difference between the throttle passing air quantity per revolution of the engine and the last engine load data by a present weight provided at a present program. Ignition timing is derived from a memory storing a plurality of ignition timings arranged in accordance with present engine load data and present engine speed.

5 Claims, 10 Drawing Sheets

IGNITION TIMING CONTROL SYSTEM FOR AUTOMOTIVE ENGINE

BACKGROUND OF THE INVENTION

The present invention relates to a system and a method for controlling ignition timing of an engine for a motor vehicle.

In a fuel injection control system having an injection pulse width calculator based on the quantity of intake air, the intake air quantity must be measured with precision. As an intake air quantity sensor, an airflow meter with a hot film type or with a hot wire is provided in an intake passage at a position upstream of a throttle valve of an engine to detect the quantity of the intake air.

Since the sensor has a high response, the output of the sensor oscillates as shown by a dot-dash line of FIG. 6 because of the pulsations of intake air induced in a cylinder of the engine. Heretofore, the output Qs is averaged to obtain the intake air quantity Qs'.

In the fuel injection control system, a basic fuel injection pulse width Tp is determined in accordance with the intake air quantity Qs' and engine speed N as follows.

$$Tp = K \cdot Qs'/N \text{ (K:constant)}$$

An actual fuel injection pulse width Ti is obtained by correcting the basic fuel injection pulse width Tp with various coefficients such as a coolant temperature coefficient, an acceleration coefficient, and a feedback correcting coefficient, so that the air fuel mixture is prevented from becoming rich or lean.

In an ignition timing control system, the basic fuel injection pulse width Tp obtained based on the average quantity Qs' is regarded as engine load. An actual ignition timing is derived from an ignition timing map in accordance with the basic injection pulse width Tp and the engine speed N.

When the throttle valve is rapidly opened for accelerating the engine, the intake air quantity sensor detects the amount of intake air Qs including intake air induced in the cylinders of the engine and intake air induced in an air chamber downstream of the throttle valve and an intake manifold.

In other words, all the air passing the throttle valve is measured by the sensor. Accordingly, the air actually induced in the cylinders can not be measured at once. The actual quantity induced in the cylinders appears on the output of the sensor with a delay D as shown in FIG. 6.

In a single-point injection system, an injector is disposed upstream of the throttle valve. Accordingly, the quantity of injected fuel can be properly determined in accordance with the quantity of intake air passing through the throttle valve. However, it is necessary to determine the ignition timing of the engine based on the quantity of intake air actually induced in the cylinders. Accordingly, if the ignition timing is determined in accordance with the basic fuel injection pulse width Tp as a parameter, ignition is temporarily delayed in the transient state. As a result, the power of the engine is temporarily reduced to reduce the driveability of the motor vehicle. Similarly, when the throttle valve is rapidly closed, the air-fuel ratio deviates to aggravate the emission.

Japanese Patent Application Laid Open Nos. 61-229954, and 62-265449 disclose systems for controlling ignition timing, where the quantity of intake air actually induced in the cylinder is estimated from an electric equivalent circuit. However, it is difficult to estimate the quantity of air in the transient state, and hence the ignition timing can not be accurately controlled.

Japanese Patent Application Laid Open No. 62-261645 describes a method for estimating the actual quantity of intake air induced into the cylinder. In this method, the pressure of the intake air downstream of the throttle valve is obtained as a function of throttle opening degree and the quantity of air detected by an air flow meter under atmospheric pressure. The quantity of air charged in a chamber and an intake passage downstream of the throttle valve in the transient state is calculated from differentiation of the calculated pressure with respect to time and the volume of the chamber and the intake passage. The actual intake quantity is obtained by subtracting the quantity of air charged in the intake manifold and the air chamber from the intake air quantity detected by the air flow meter.

However, since the actual quantity of air induced into the cylinders of the engine is only an estimation from the throttle position, the ignition timing can not be properly controlled.

SUMMARY OF THE INVENTION

The object of the present invention is to provide a system for controlling the ignition timing of an automotive engine, which may accurately calculate the quantity of intake air actually induced into cylinders of the engine and load corresponding to the intake air quantity, whereby the ignition timing is properly determined in a transient state.

According to the present invention, there is provided a system for controlling the ignition timing of an engine having a computer for periodically performing a program, comprising engine speed calculator means for calculating engine speed and for producing an engine speed signal, air calculator means for calculating the quantity of intake air passing a throttle valve of the engine and for producing a throttle passing air quantity, weight providing means responsive to the engine speed signal for producing a weight for a weighted average, load data calculator means adding a last engine load data at a last program and a quotient calculated by dividing the difference between the throttle passing air quantity calculated by the throttle passing air calculator means per revolution of the engine and the last engine load data by a present weight provided at a present program and for producing present engine load data at the present program, memory means storing a plurality of ignition timings arranged in accordance with the present engine load data and the present engine speed, deriving means for deriving an ignition timing in accordance with the present engine load data obtained by the load data calculation means and a present engine speed signal obtained by the engine speed calculator means.

The other objects and features of this invention will become understood from the following description with reference to the accompanying drawings.

DETAILED DESCRIPTION OF THE PREFERRED EMBODIMENTS

Figure 1:
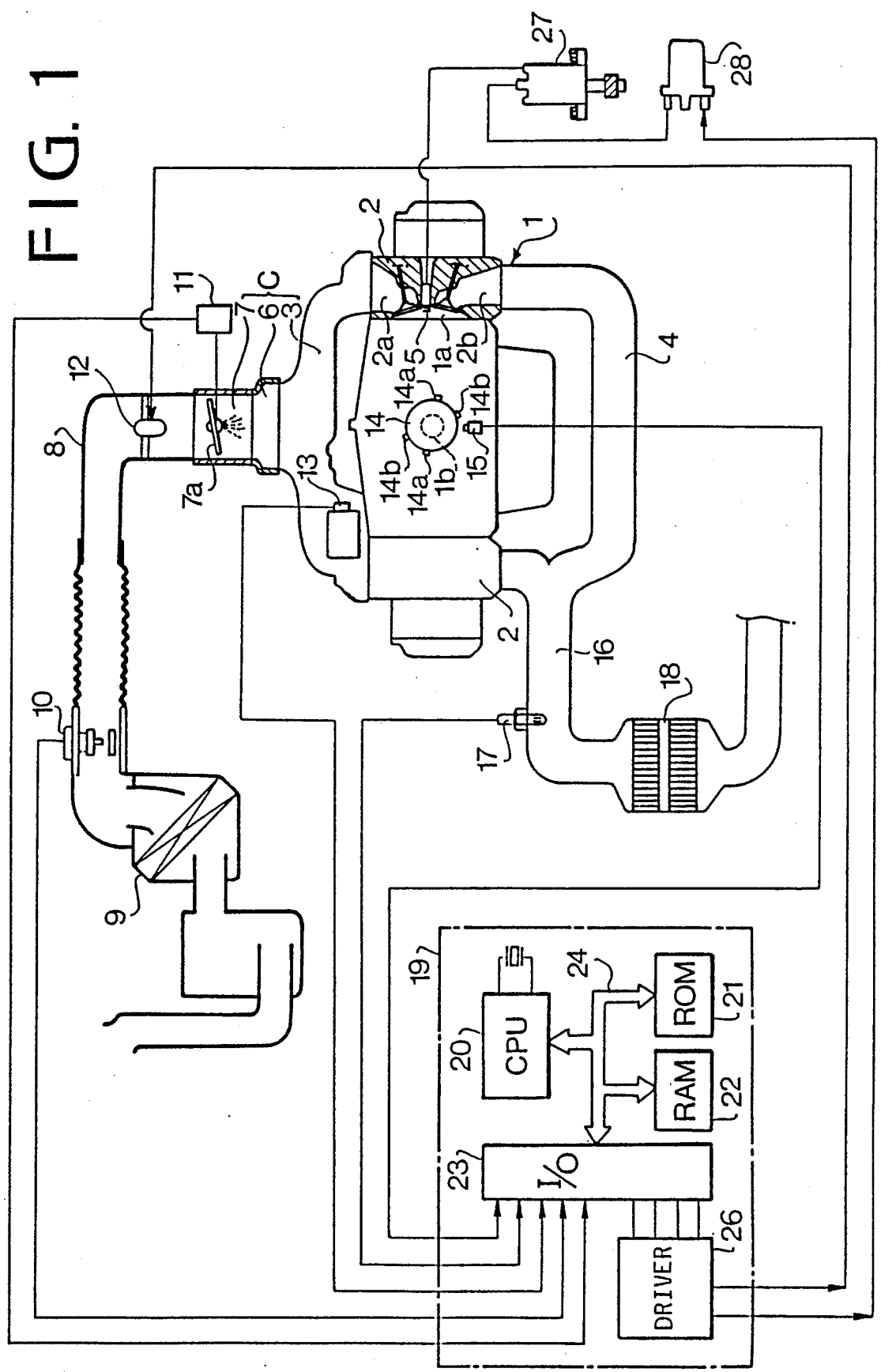
FIG. 1 is a schematic illustration of a system according to the present invention.

Referring to FIG. 1 showing a horizontal opposite type four-cylinder engine 1, a cylinder head 2 of the engine 1 has intake ports 2a and exhaust ports 2b which are communicated with an intake manifold 3 and an exhaust manifold 4, respectively. A spark plug 5 is located in each combustion chamber 1a formed in the cylinder head 2. A throttle chamber 7 having a throttle valve 7a is communicated with the intake manifold 3 through an air chamber 6. The throttle chamber 7 is communicated with an air cleaner 9 through an intake pipe 8. The throttle chamber 7 downstream of the throttle valve 7a, the air chamber 6, the intake manifold 3, and the intake port 2a upstream of an intake valve comprise a chamber C.

An intake air quantity sensor 10 (hot wire type air flow meter) is provided in the intake pipe 8 downstream of the air cleaner 9. A throttle position sensor 11 is provided for detecting the opening degree of the throttle valve 7a. A fuel injector 12 is provided in the intake pipe 8 upstream of the throttle valve 7a. A coolant temperature sensor 13 is provided in a coolant jacket (not shown) of the engine 1. A crankshaft disk 14 is secured to a crankshaft 1b of the engine 1. A crank angle sensor 15 (magnetic pickup) is provided adjacent the crankshaft disk 14.

Figure 4:
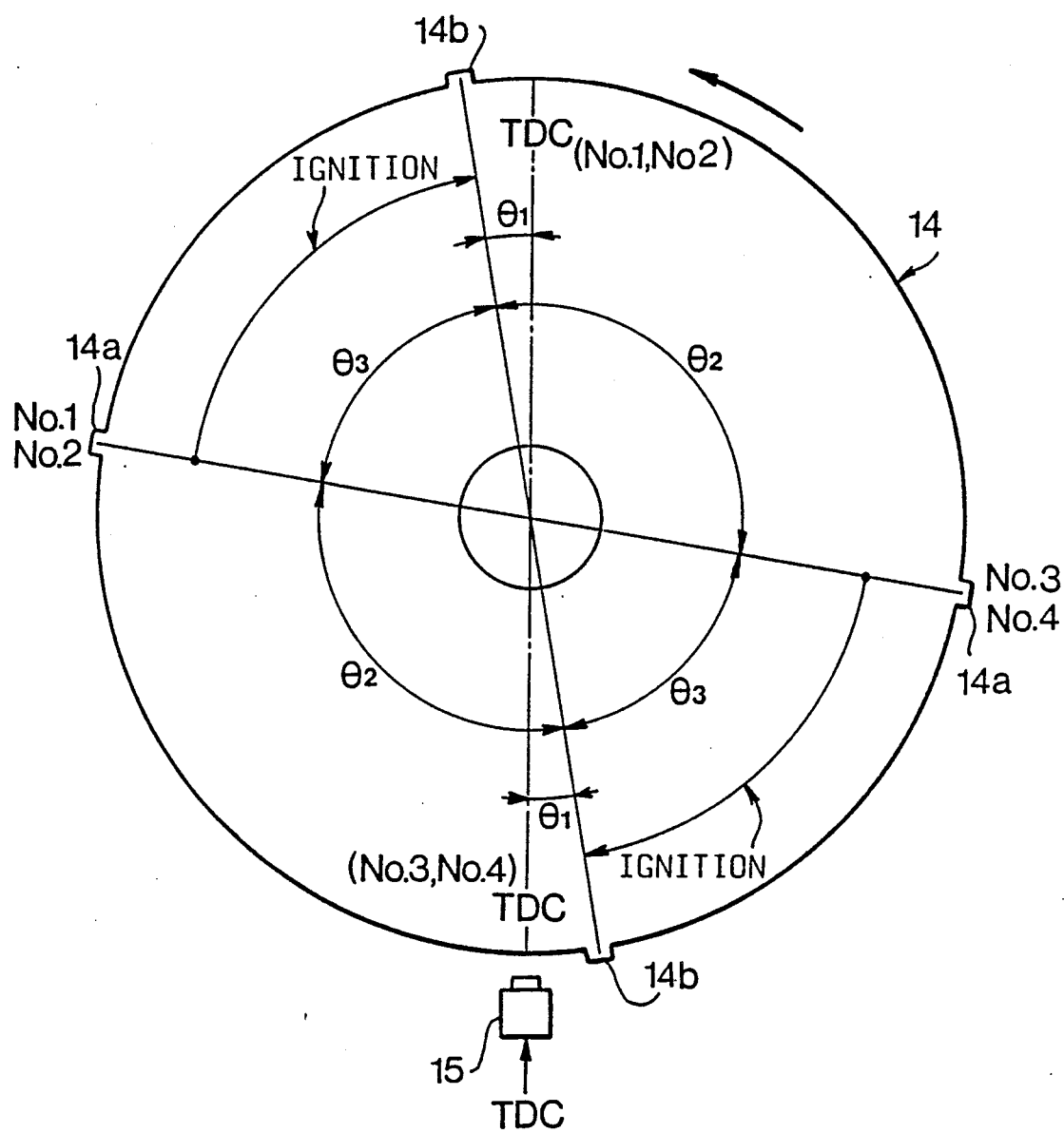
FIG. 4 shows a crankshaft disk provided in the system.

Referring to FIG. 4, cylinders of the engine are divided into two groups. The first group consists of No. 1 and No. 2 cylinders, and the second group consists of No. 3 and No. 4 cylinders. In each group, top dead centers for both cylinders have the same timing. The crankshaft disk 14 has a pair of projections 14a representing a basic crank angle and a pair of projections 14b representing a basic point for calculating angular velocity. The projections 14a are diametrically opposite to each other and the projections 14b are also diametrically opposite to each other.

Each angle $\theta_1$ of the projections 14b is, for example, 10° before the top dead center (BTDC). An angle $\theta_2$ between the projections 14b and 14a is 110° and an angle $\theta_3$ between the projection 14a and the other projection 14b is 70°.

When the crankshaft disk 14 rotates, the crank angle sensor 15 detects positions of the projections 14a and 14b and produces signals in the form of pulses.

An $O_2$-sensor 17 and a catalytic converter 18 are provided in an exhaust passage 16 communicated with the exhaust manifold 4.

Referring to FIG. 1, an electronic control unit 19 comprising a microcomputer has a CPU 20, a ROM 21, a RAM 22, and an input/output interface 23, which are connected to each other through a bus line 24.

Operating condition parameter detecting means 25 (FIG. 2) comprising sensors 10, 11, 13, 15 and 17 is connected to an input port of the input/output interface 23. An output port of the interface 23 is connected to a driver 26 which is connected to the injector 12 and the spark plug 5 of a corresponding cylinder through an ignition coil 28 and a distributor 27.

Control programs and fixed data such as an ignition timing map are stored in the ROM 21. Output signals of the sensors are stored in the RAM 22. The CPU 20 calculates the fuel injection pulse width and the ignition timing in accordance with the control programs in the ROM 21 and based on various data in the RAM 22.

Figure 2:
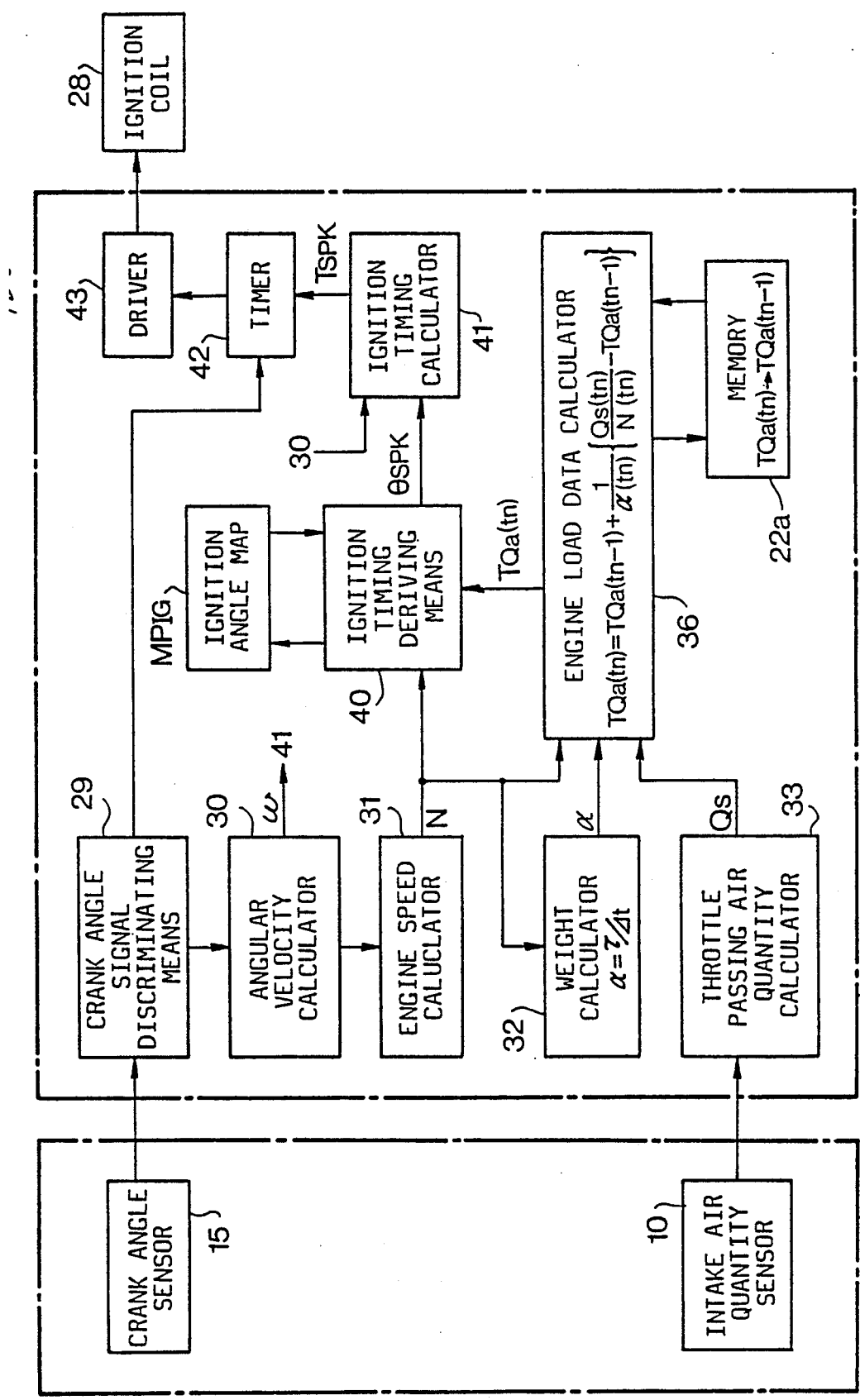
FIG. 2 is a block diagram of an electronic control unit.

Referring to FIG. 2, the control unit 19 comprises crank angle signal discriminating means 29 applied with the crank signal from the crank angle sensor 15. The crank angle signal discriminating means 29 discriminates a reference crank angle signal A dependent on the projection 14a from an angle signal B dependent on the projection 14b. Namely, on the basis of a first crank angle signal applied from the sensor 15, an interval T1 between the first crank angle signal and a second crank angle signal is measured. Then, on the basis of the second crank angle signal, an interval T2 between the second crank angle signal and a third crank angle signal generated after the second crank angle signal is measured. The interval T1 is compared with the interval T2. When $T_2 < T_1$, it is determined that the third crank angle signal produced after the second crank angle signal is the signal B. When $T_2 > T_1$, it is determined that the third crank angle signal is the signal A. When the crank angle signal A is discriminated, the crank angle signal discriminating means 29 produces a trigger signal which is applied to a timer 42.

These signals A and B are applied to an angular velocity calculator 30 where the angular velocity $\omega$ of the crankshaft 1b is obtained from the data of angle $\theta_2$ stored in the ROM 21 in accordance with a time interval $T\theta$ from the signal B to the signal A.

The angular velocity $\omega$ is applied to an engine speed calculator 31 for calculating engine speed N.

A throttle valve passing air quantity calculator 33 calculates intake air quantity Qs passing the throttle valve 7a and a bypass passage around the throttle valve having an idle speed control valve (not shown) in accordance with waveforms of an output signal from the intake air quantity sensor 10.

A weight calculator 32 is applied with the engine speed N from the engine speed calculator 31 to obtain a weight $\alpha$.

The weight $\alpha$ is obtained by differentiating the time constant $\tau$ of a first order lag with a calculating period t.

$$\alpha = \tau/\Delta t$$

The time constant $\tau$ of the first order lag is $$\tau = \frac{2 \times Vc}{N \times \eta V \times VH} \quad (1)$$

where
N is the engine speed (rps),
Vc is the capacity of the chamber C ($m^3$),
v is the volumetric efficiency with respect to pressure ($kg/m^2$) and temperature (°K.) in the chamber C, VH is the displacement of the engine (m³).
Thus, the weight α is rewritten as follows $$\alpha = \frac{2 \times VC}{N \times \eta V \times VH \times \Delta t} \quad (1-1)$$

The capacity Vc and the displacement VH are constants in the engine. Further, the volumetric efficiency ηv is a constant, since it is varied little by load.

Thus, if Kv is represented as follows:

$$\frac{2 \times VC}{\eta V \times VH} = KV = \text{const}$$

the time constant $\tau$ is represented as a function of the engine speed N as follows, the value of which is in inverse proportion to the engine speed N.

$$\tau = Kv/N \quad (2)$$

The calculating period $\Delta t$ is determined by the program and the capacity of the CPU 20 and is constant without influence of the engine speed.

Accordingly, $$\frac{2 \times VC}{\eta V \times VH \times t} = KV' = \text{const}$$

Therefore,
$$\alpha = Kv'/N \quad (2-1)$$

An engine load data calculator 36 calculates an engine load data TQa(tn) in accordance with the weight α and the intake air quantity Qs applied from the throttle valve passing air quantity calculator 33 as below.

Figure 5:
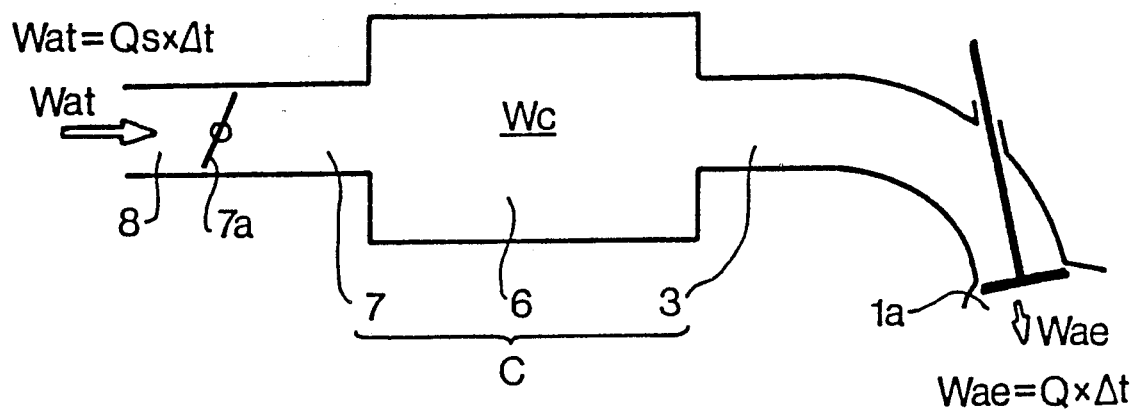
FIG. 5 is a schematic diagram showing an intake system.

Referring to FIG. 5, assuming that a detecting time of the intake air quantity Qs detected by the intake air quantity sensor 10 coincides with a time when the air passes the throttle valve 7a and the bypass passage, the weight Wat (kg) of the intake air entering the chamber C at a calculating period $\Delta t$ is $$Wat = Qs \times \Delta t \quad (3)$$

The weight Wae(kg) of the intake air induced in the combustion chambers 1a from the chamber C at the calculating period is $$Wae = Q \times \Delta t \quad (4)$$

On the other hand, the actual intake air quantity Q can also obtained in accordance with volume flow Vae (m³/sec) per unit time and a specific gravity $\epsilon$ of air in the chamber C as follows.

$$Q = Vae \times \epsilon \quad (5)$$

The volume flow Vae is $$Vae = \frac{N \times \eta V \times VH}{2} \quad (6)$$

where N/2 is the number of times of intake strokes per one sec. of the four-cycle engine.

The specific gravity $\epsilon$ of air is obtained by the equation of state as follows.

$$\epsilon = \frac{PC}{RC \times TC} \quad (7)$$

where
Rc is the gas constant (kgm/kg°K.) of the air,
Tc is the temperature of the air in the chamber C (°K.), and
Pc is the pressure in the chamber C (kg/m²).

Therefore, the equation (5) is $$Q = \frac{N \times \eta V \times VH}{2} \times \frac{PC}{RC \times TC} \quad (8)$$

The specific gravity $\epsilon$ is represented as a proportion of a weight Wc(kg) of the air in the chamber C to the capacity Vc(m³) of the chamber C. Thus, the equation (8) is changed to $$Q = \frac{N \times \eta V \times VH}{2} \times \frac{WC}{VC} \quad (9)$$

The weight Wc(tn) of the air in the chamber C at a time(tn) is obtained by subtracting the weight Wae of the intake air induced into the combustion chamber 1a from the sum of the weight Wc(tn−1) of the air at the last time (tn−1) and the weight Wat(tn) of newly induced intake air into the chamber C at the present time (tn).

The time when the intake air is induced into the combustion chamber 1a is either the last time (tn−1) or the present time(tn). Assuming it to be the last time, the input and output relation of the weight of the intake air in the chamber C is expressed by the difference equation as follows.

$$\begin{aligned} WC(tn) &= WC(tn-1) + Wat(tn) - Wae(tn-1) \\ &= WC(tn-1) + Qs(tn) \times \Delta t - Q(tn-1) \times \Delta t \end{aligned} \quad (10)$$

In case of the weight Wae(tn) of the intake air at the present time Wae(tn), the weight Wc(tn) of the air is $$\begin{aligned} WC(tn) &= WC(tn-1) + Wat(tn) - Wae(tn) \\ &= WC(tn-1) + Qs(tn) \times \Delta t - Q(tn) \times \Delta t \end{aligned} \quad (10')$$

If the equation (1) representing the time constant $\tau$ is substituted for the equation (8), $$Wc = Q \times \tau$$

Thus, the weight (Wc(tn)) of the air in the chamber C at the present time is $$Wc(tn) = Q(tn) \times \tau(tn) \quad (11)$$

and the weight Wc(tn−1) of the air at the last time is $$Wc(tn-1) = Q(tn-1) \times \tau(tn-1) \quad (12)$$

Substituting the equations (11) and (12) for the equation (10), the intake air quantity Q(tn) at the present time is $$Q(tn) = \frac{\frac{\tau(tn-1)}{\Delta t} - 1}{\frac{\tau(tn)}{\Delta t}} Q(tn-1) + \frac{1}{\frac{\tau(tn)}{\Delta t}} Qs(tn) \quad (13)$$

Since $\alpha = \tau/\Delta t$, the above equation is expressed as follows.

$$Q(tn) = \frac{\alpha(tn-1) - 1}{\alpha(tn)} Q(tn-1) + \frac{1}{\alpha(tn)} Qs(tn) \quad (13a)$$

Substituting the equations (11) and (12) for the equation (10'), the intake air quantity Q(tn) at the present time is expressed as follows.

$$Q(tn) = \frac{\frac{\tau(tn-1)}{\Delta t}}{\frac{\tau(tn)}{\Delta t} + 1} Q(tn-1) + \frac{1}{\frac{\tau(tn)}{\Delta t} + 1} Qs(tn) \quad (13a')$$

$$= \frac{\alpha(tn-1)}{\alpha(tn) + 1} Q(tn-1) + \frac{1}{\alpha(tn) + 1} Qs(tn)$$

In the equations (13a) and (13a'), $\alpha(tn-1)$ and $\alpha(tn)$ are weights at the last time and the present time from the weight calculator 32. The intake air quantity Q(tn) is obtained through the weighted average with the weights at the last time and the present time.

In the engine load data calculator 36, the intake air quantity Q(tn) is calculated in accordance with the equation (13a).

The sum of the weights $$\frac{\alpha(tn-1) - 1}{\alpha(tn)} \text{ and } \frac{1}{\alpha(tn)} \text{ in the equation (13a)}$$

is $\alpha(tn-1)/\alpha(tn)$. The time constant $\tau$ and the engine speed N in the equation (2-1) are in inverse proportion to each other. Therefore, the sum of the weights during acceleration of the engine is $$\alpha(tn-1)/\alpha(tn) < 1$$

The sum of the weights during deceleration is $$\alpha(tn-1)/\alpha(tn) > 1$$

Namely, the weight ratio (correction value) varies with the engine speed. Accordingly, the value of the calculated intake air quantity Q(tn) changes in accordance with the variation of the engine speed, so that the intake air quantity Q(tn) can be accurately calculated even if the operation of the engine is in a transient state.

In the equation (13a') the sum of the weights is $$\frac{\alpha(tn-1) + 1}{\alpha(tn) + 1}$$

The equation becomes $\alpha(tn-1)/\alpha(tn)$ if 1 is omitted. Accordingly, the weight ratio varies with the variation of the engine speed the same as the above.

Figure 6:
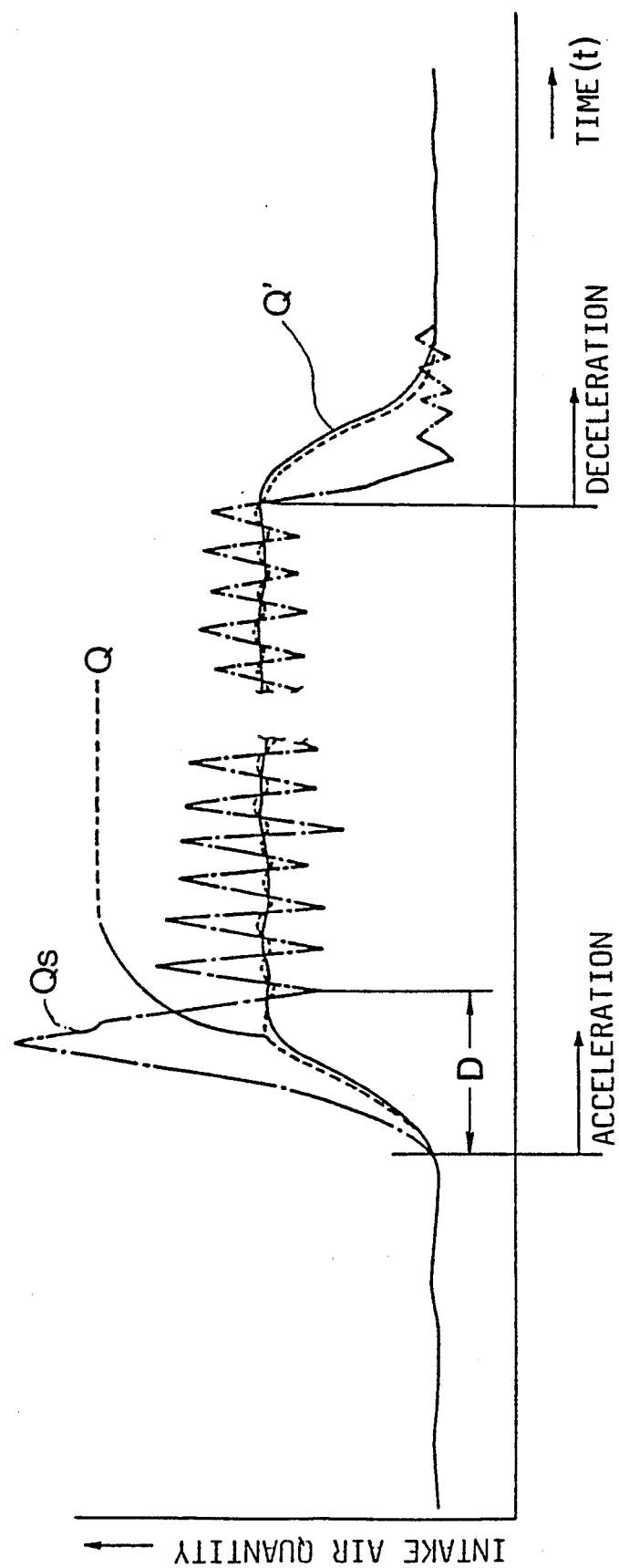
FIG. 6 is a graph showing variations of intake air quantity.

FIG. 6 shows results of experiments conducted by the applicant. It will be seen that the calculated intake air quantity Q is substantially equal to the actually induced intake air quantity Q', which is obtained by experiments using a mole I, in a wide operation range of the engine including a low speed range.

The intake air quantity Q(tn) is not based on the engine load. In order to properly control the ignition timing, it is necessary to provide engine load data TQa(tn) corresponding to the intake air quantity. The engine load data proportional to the engine torque is obtained by correcting the quantity Q(tn) to the quantity induced per revolution of the engine as follows.

$$TQa(tn) = Q(tn)/N/(tn) \quad (13b)$$

Accordingly, the equation (13a) is modified as $$TQa(tn) = \frac{\alpha(tn) - 1}{\alpha(tn)} \times TQa(tn-1) + \frac{1}{\alpha(tn)} \times \frac{Qs(tn)}{N(tn)} \quad (13c)$$

The equation (13c) is further modified as follows.

$$TQa(tn) = \quad (13d)$$

$$TQa(tn-1) + \frac{1}{\alpha(tn)} \left( \frac{Qs(tn)}{N(tn)} - TQa(tn-1) \right)$$

Namely, the present engine load data TQa(tn) is obtained by adding the last engine load data (TQa(tn-1)) and the quotient calculated by dividing the difference between the air quantity passing the throttle valve per revolution of the engine (Qs(tn)/N(tn)) and the last engine load data (TQa(tn-1)) by the present weight $\alpha(tn)$.

The engine load data TQa(tn) produced at the calculator 36 and the weight $\alpha(tn)$ obtained at the calculator 32 are stored in predetermined addresses of a memory 22a in the RAM 22. The engine load data TQa(tn) and the engine speed N are applied to an ignition time deriving means 40. In the means 40, a corresponding operation range stored in an ignition angle map MP$_{IG}$ is selected in accordance with these signals TQa(tn) and N, and an ignition angle $\theta_{SPK}$ is a derived from the selected operation range. The ignition angle $\theta_{SPK}$ is applied to an ignition timing calculator 41 which is also applied with the angular velocity $\omega$ from the calculator 30. An ignition timing T$_{SPK}$ is calculated as follows.

$$T_{SPK} = \theta_{SPK}/\omega$$

The ignition timing T$_{SPK}$ is set in the timer 42 which starts measuring time in accordance with the angle signal A representing 80° BTDC. When the timer reaches a set ignition timing T$_{SPK}$, a spark signal spk is applied to the ignition coil 28 through a driver 43.

Since the ignition timing T$_{SPK}$ is determined in accordance with the engine load data TQa(tn) as a load parameter which is obtained based on the intake air quantity Q(tn), an optimum ignition timing is quickly determined at the transient state of the engine as well as the steady state of the engine.

Figure 3:
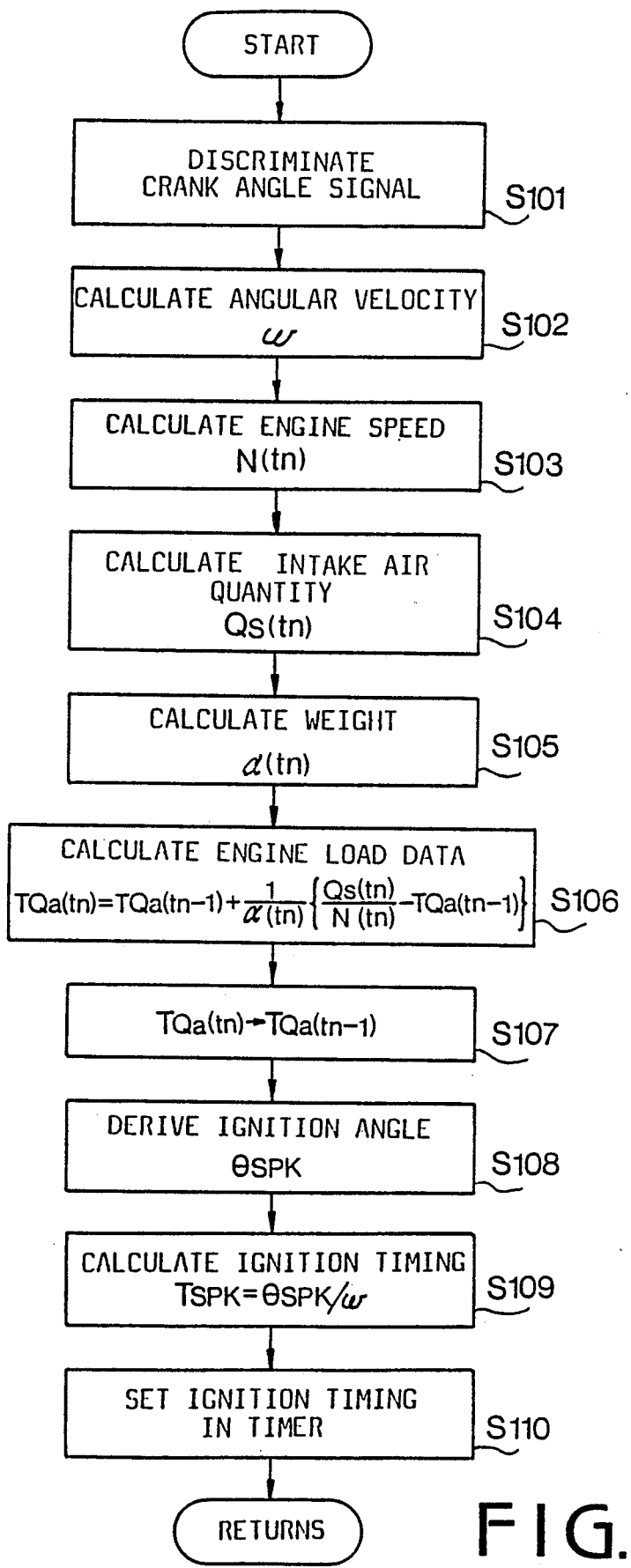
FIG. 3 is a flowchart showing a calculation routine for the ignition timing control of the system.

Explaining the control of the ignition timing with reference to a flowchart of FIG. 3, at a step S101, the reference crank angle signal A is discriminated from the crank angle signal B. At steps S102 and S103, the angular velocity $\omega$ at the present time and the engine speed N(tn) based on the angular velocity $\omega$ are calculated in accordance with the output signal from the crank angle sensor 15, respectively. At a step S104, the intake air quantity Qs(tn) is calculated from the output signal of the intake air quantity sensor 10.

At a step S105, the weight $\alpha(tn)$ is calculated in accordance with the engine speed N(tn) and the calculating period $\Delta t$ in dependency on the following equations.

$$\alpha(tn) = \tau(tn)/\Delta t = Kv'/N(tn)$$

$\tau(tn)$ is obtained from the equation (1).

At a step S106, the engine load data TQa(tn) is obtained by calculating the equation (13d).

At a step S104, if the program is its first time, data of the last time do not exist. Accordingly, the program jumps to a step S107, where the ratio of the engine speed N and the intake air quantity Qs obtained at the steps S103 and 104 respectively are stored in the RAM 22 as data at the last time, and then the program gets out of the routine.

After the first time, the program goes to the step S107 from the step S106, where the engine load data TQa(tn) is stored in the RAM 22 as data at the last time.

At a step S108, the ignition angle $\theta_{SPK}$ is derived from the ignition angle map MP$_{IG}$ in accordance with the signals N and TQa(tn). At a step S109, the ignition timin T$_{SPK}$ with respect to the signal A is calculated based on the angular velocity $\omega$ and the ignition angle $\theta_{SPK}$ (T$_{SPK}$ = $\theta_{SPK}/\omega$). At a step S110, the ignition timin T$_{SPK}$ is set in the timer 42 which starts measuring time with respect to the signal A. When the timer reaches the set ignition timin T$_{SPK}$, the spark signal spk is applied to the ignition coil 28 to cut off the circuit for the primary winding of the coil 28. The spark plug 5 of the corresponding cylinder is ignited through the distributor 27.

Figure 7:
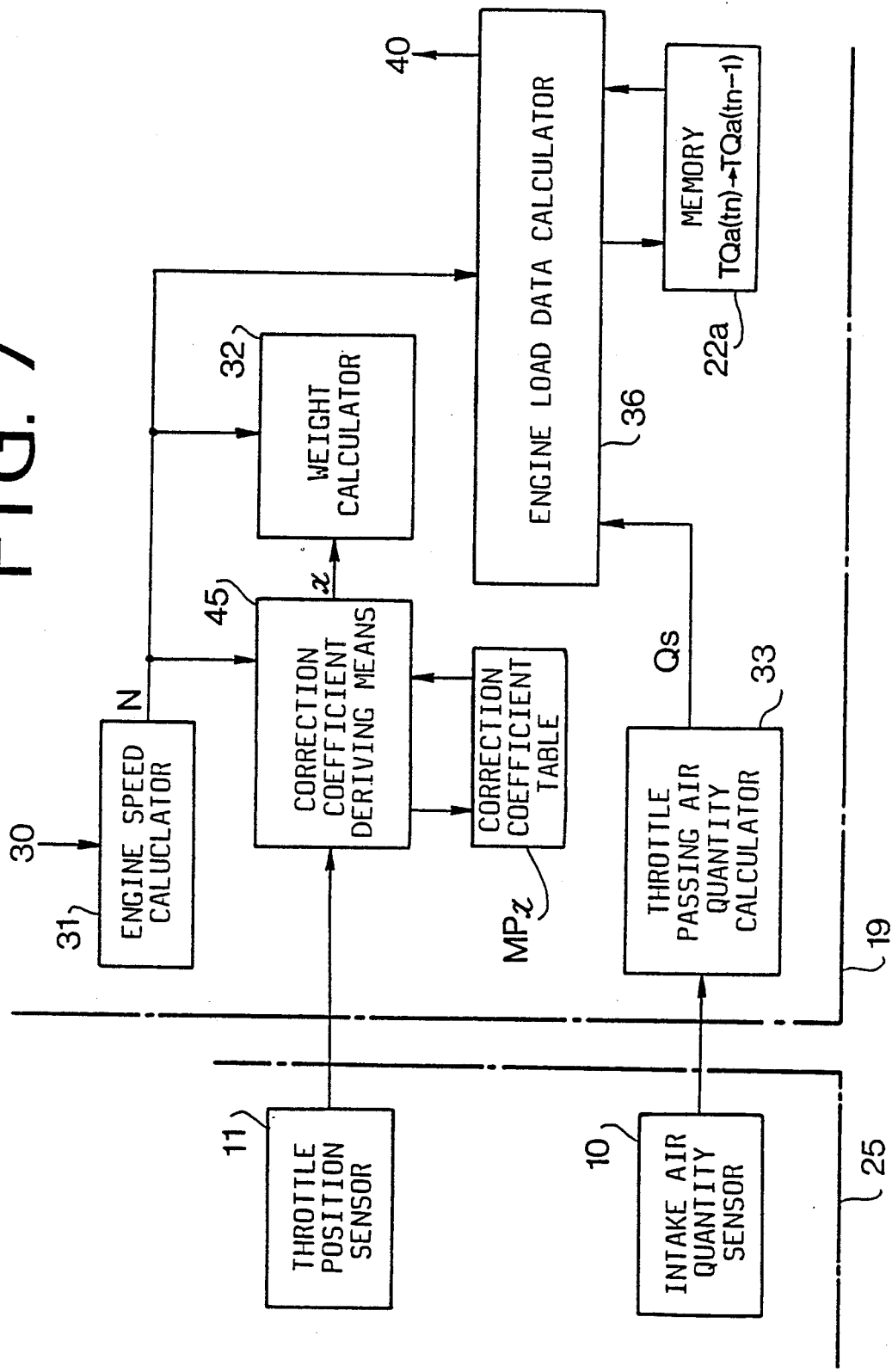
FIG. 7 is a block diagram showing a main part of a system of a second embodiment of the present invention.

FIG. 7 shows a main part of the system of the second embodiment. In the first embodiment, the volumetric efficiency $\eta v$ in the equation (1) is regarded as constant. However, the volumetric efficiency reduces ($\eta v < 1$) because of the back flow of the intake air in a low engine speed range at light load. Accordingly, it is necessary to correct the weight $\alpha$ of the equation (1-1) in accordance with engine operating conditions.

In the system of the second embodiment, a correction coefficient deriving means 45, and a correction coefficient table MPx are provided as shown in FIG. 7. Correction coefficients $\chi$ are obtained by experiments on the throttle opening degree $\theta$Th and the engine speed N and stored in the map MPx. The correction coefficient deriving means 45 derives a correction coefficient from the map MPx in accordance with the engine speed N and the throttle opening degree $\theta$Th. The weight calculator 32 calculates the weight $\alpha$ as described above and corrects the weight $\alpha$ with the correcting coefficient $\chi$ to produce a corrected weight $\alpha\chi$. The engine load data calculator 36 calculates the engine load data TQa(tn) based on the corrected weight $\alpha\chi$ and the throttle valve passing air quantity QS as described hereinbefore. Other compositions and operations are the same as the first embodiment.

Thus, the engine load data is quickly calculated without using a microcomputer having a large capacity at a low manufacturing cost.

Figure 8:
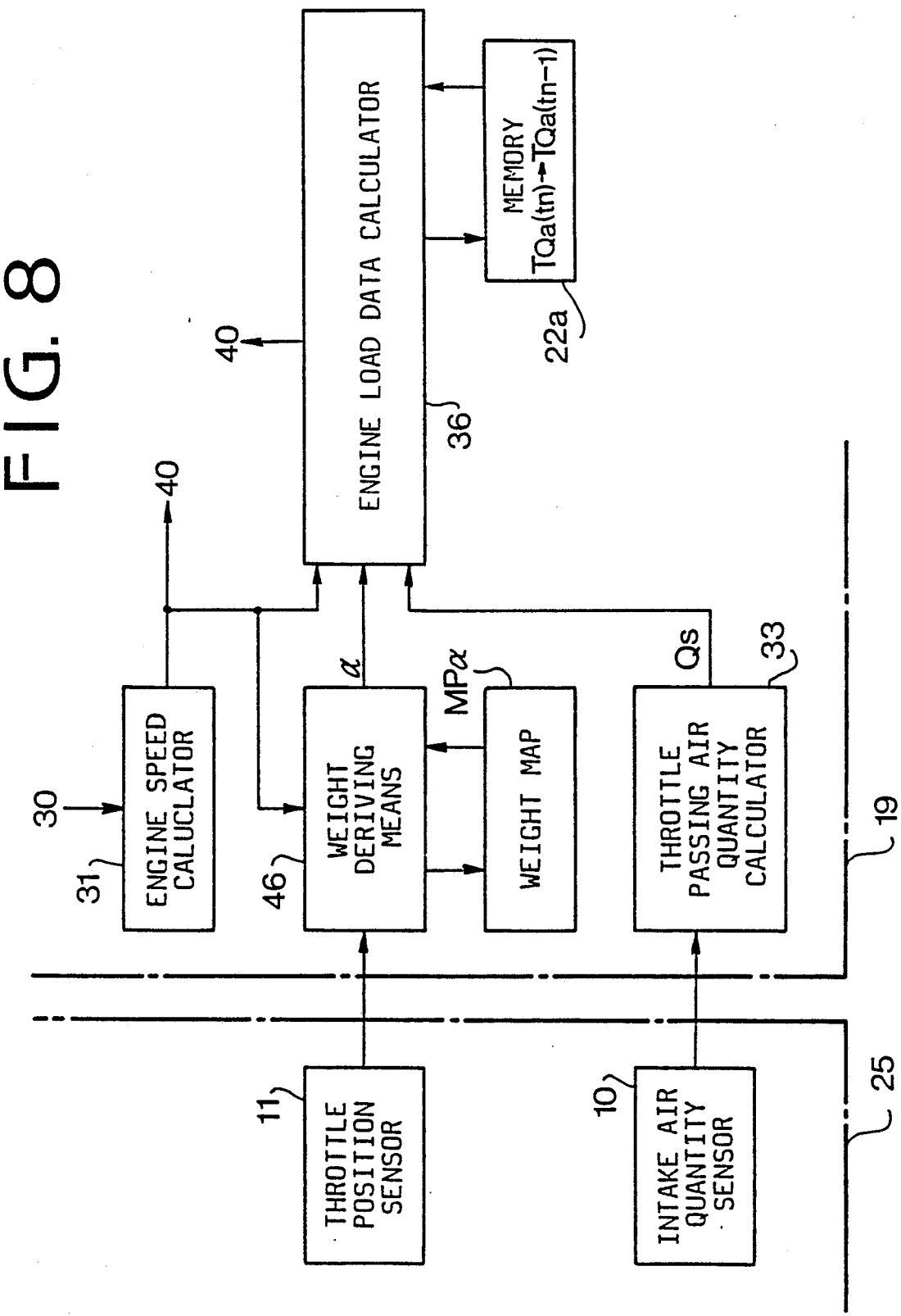
FIG. 8 is a block diagram of a main part of a third embodiment of the present invention.

In the system of the third embodiment, the main part of which is shown in FIG. 8, a weight deriving means 46 and a weight map MP $\alpha$ are provided.

The weight deriving means 46 is applied with the engine speed N from the engine speed calculator 31 and the throttle valve opening degree $\theta$ from the throttle position sensor 11 and derives a weight $\Gamma$ from the weight map MP $\alpha$ stored in the ROM 21 in accordance with the signals N and $\theta$ as parameters.

Since the weight $\alpha$ is obtained from the map, the calculation of the weight is not necessary, thereby reducing the time for obtaining the weight. Further, it is possible to store weights in the map, which includes the correction coefficient $\chi$ for the variation of the volumetric efficiency dependent on the back flow of the intake air and the variation of the throttle opening degree in a low engine speed range.

If the weight $(\alpha(tn)-1)/\alpha(tn)$ and the weight $1/\alpha(tn)$ in the equation (13c) are regarded as an intake air quantity coefficient $\beta_1$ and throttle passing air quantity coefficient $\beta_2$, both weights are expressed as follows.

$$(\alpha(tn-1)/\alpha(tn) = \beta_1$$

$$1/\alpha(tn) = \beta_2$$

The engine load data TQa(tn) in the equation (13c) is expressed as follows.

$$TQa(tn) = \beta 1 \times TQa(tn-1) + \beta 2 \times \frac{Qs(tn)}{N(tn)} \quad (14)$$

From the equation (2-1), it will be understood that the coefficients $\beta_1$ and $\beta_2$ can be represented as functions dependent only on the engine speed N.

Figure 9:
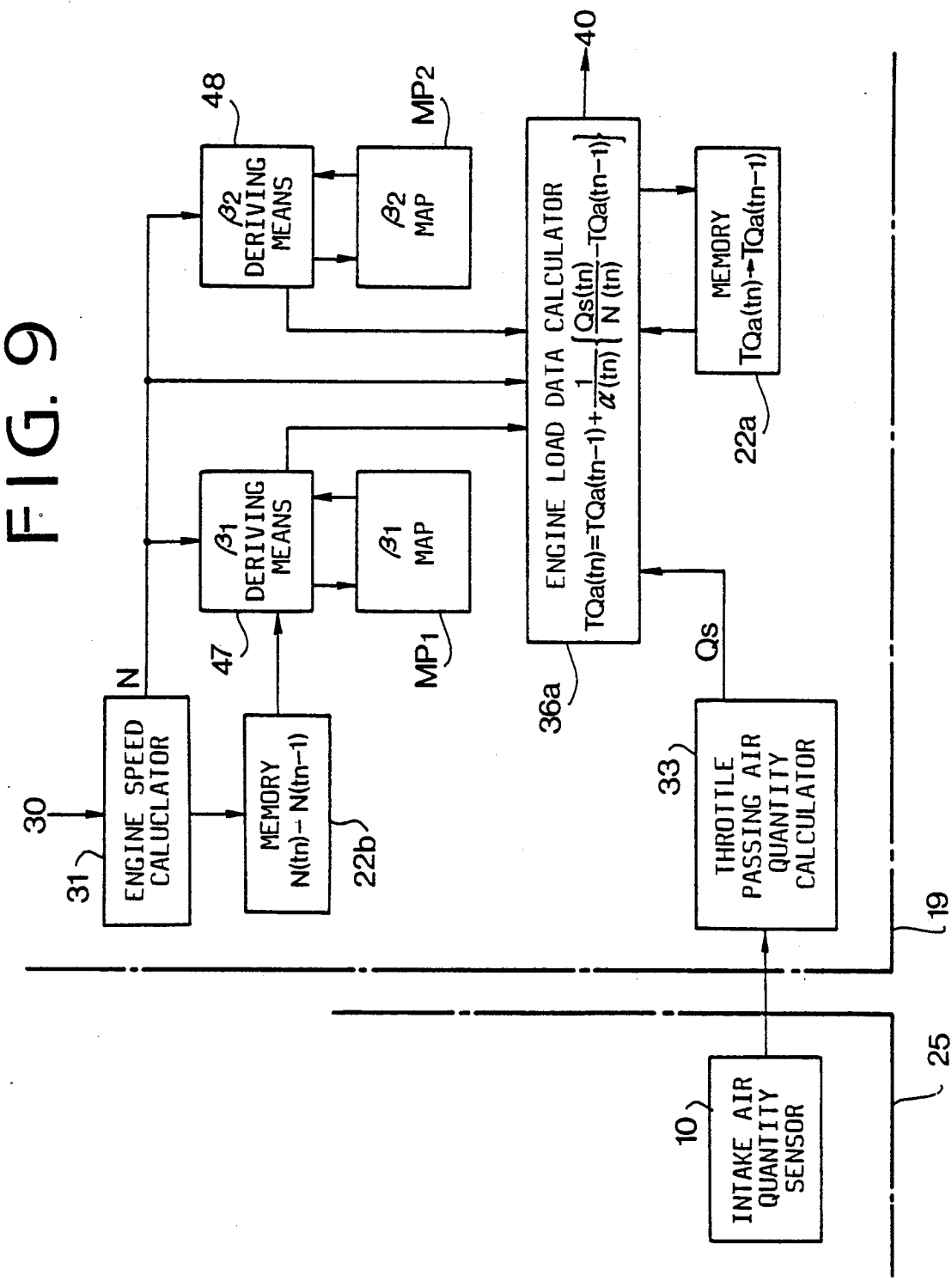
FIG. 9 is a block diagram of a main part of a fourth embodiment of the present invention.
Figure 10:
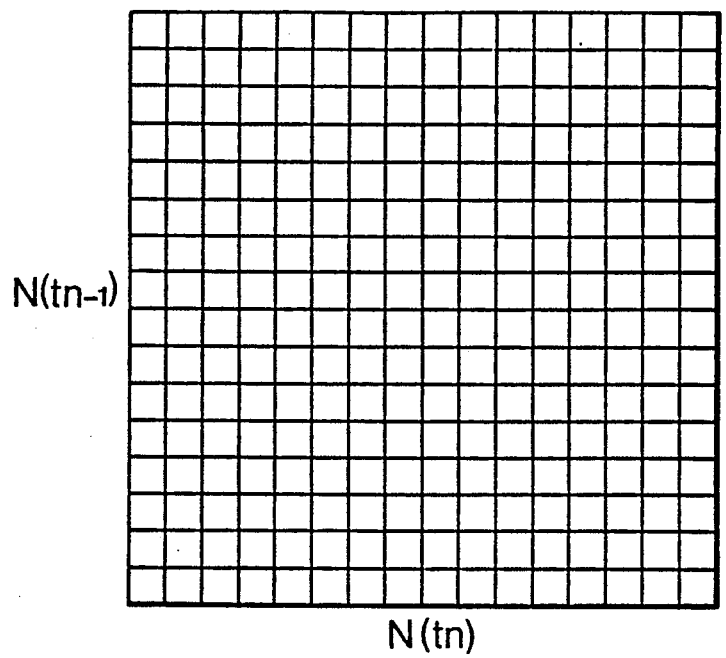
FIGS. 10 and 11 show coefficient maps.
Figure 11:
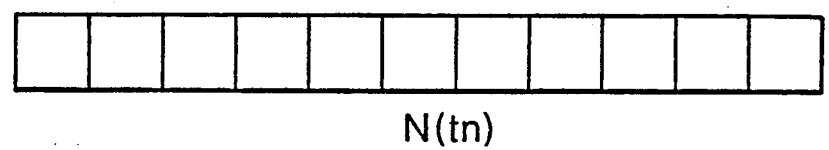

In the fourth embodiment shown in FIG. 9, a $\beta_1$ map MP$_1$, and a $\beta_2$ map MP$_2$ are provided, in which the coefficients $\beta_1$ and $\beta_2$ obtained by experiments are stored. FIG. 10 shows the $\beta_1$ map MP$_1$ in which the intake air quantity coefficients $\beta_1$ are stored of an address in accordance with the present time engine speed N(tn) and the last time engine speed N(tn−1). FIG. 11 shows the $\beta_2$ map MP$_2$ in which the throttle passing air quantity coefficients $\beta_2$ are stored in accordance with the present time engine speed N(tn).

The system is provided with an engine speed memory 22b in the RAM 22 for storing the last time engine speed N(tn)−1), and $\beta_1$ and $\beta_2$ deriving means 47 and 48.

The $\beta_1$ deriving means 47 derives the intake air quantity coefficient $\beta_1$ from the $\beta_1$ map MP$_1$ in accordance with the present time engine speed N(tn) from the engine speed sensor 31 and the last time engine speed N(tn−1) from the memory 22b. The $\beta_2$ deriving means 48 derives a throttle passing air quantity coefficient $\beta_2$ from the $\beta_2$ map in accordance with the present time engine speed. The coefficients $\beta_1$ and $\beta_2$ are applied to an engine load data calculator 36a which calculates the engine load data TQa(tn) in accordance with the equation (14). Other operations of the system are the same as the first embodiment.

In accordance with the present invention, engine load data based on intake air quantity corresponding to the actually induced intake air quantity is accurately calculated.

Thus, optimum ignition timing is determined, thereby improving the driveability of the motor vehicle, the efficiency of the engine and exhaust emission.

While the presently preferred embodiments of the present invention have been shown and described, it is to be understood that various changes and modifications may be made without departing from the scope of the invention as set forth in the appended claims.

What is claimed is:

1. A system for controlling the ignition timing of an engine having a computer for periodically performing a program and engine speed calculator means for calculating engine speed and for producing an engine speed signal, comprising:
- air calculator means for calculating a quantity of intake air passing a throttle valve of the engine per revolution of the engine and for producing an air quantity signal;
- weight providing means responsive to the engine speed signal for producing a weight for a weighted average;
- load data calculator means for adding a last engine load data at a last program and a quotient calculated by dividing the difference between the air quantity signal and the last engine load data by a present weight provided at a present program and for producing present engine load data at the present program;
- memory means storing a plurality of ignition timings arranged in accordance with present engine load data and the present engine speed; and
- deriving means for deriving an ignition timing in accordance with a present engine load data obtained by the load data calculation means and a present engine speed signal obtained by the engine speed calculator.

2. The system according to claim 1, further comprising
- a throttle position sensor, and the weight providing means comprising a first map storing a plurality of weights which are arranged in accordance with engine speed and throttle position detected by the throttle position sensor and providing a weight derived from the first map.

3. The system according to claim 1, further comprising
- a throttle position sensor, a second map storing a plurality of correction coefficients arranged in accordance with the engine speed and the throttle position detected by the throttle position sensor, and the weight providing means being arranged to provide a weight corrected with a correction coefficient derived from the second map.

4. A method for performing calculation of the quantity of intake air in an engine, comprising:
- calculating engine speed and producing an engine speed signal;
- calculating the quantity of intake air passing a throttle valve of the engine and producing a throttle passing air quantity;
- producing a weight for a weighted average from the engine speed signal;
- adding a last engine load data at a last program and a quotient calculated by dividing the difference between the throttle passing air quantity per revolution of the engine and the last engine load data by a present weight provided at a present program and producing a present engine load data at the present program; and
- deriving an ignition timing from a memory in accordance with a present engine load data and a present engine speed signal.

5. A system for controlling the ignition timing of an engine having a computer for periodically performing a program and engine speed calculator means for calculating engine speed and for producing an engine speed signal, comprising:
- air calculator means for calculating a quantity of intake air passing a throttle valve of the engine per revolution of the engine and for producing an air quantity signal;
- first coefficient providing means responsive to the engine speed signal for providing a present first coefficient representing an inverse number of a weight for a weighted average;
- second coefficient providing means responsive to the engine speed signal for providing a present second coefficient representing difference between one and the inverse number of a weight;
- load data calculator means for adding a value multiplying last engine load data at a last program by the present second coefficient and a value multiplying a present air quantity signal at a present program by the present first coefficient and for producing present engine load data at the present program;
- memory means storing a plurality of ignition timings arranged in accordance with engine load data and engine speed; and
- deriving means for deriving an ignition timing in accordance with the present engine load data and the engine speed signal.

* * * * *